US006832574B1

United States Patent
Coconas

(10) Patent No.: US 6,832,574 B1
(45) Date of Patent: Dec. 21, 2004

(54) BICYCLE WHISTLE

(76) Inventor: James Gregory Coconas, 8900 Barnett Valley Rd., Sebastopol, CA (US) 95472

( * ) Notice: Subject to any disclaimer, the term of this patent is extended or adjusted under 35 U.S.C. 154(b) by 0 days.

(21) Appl. No.: 10/393,621

(22) Filed: Mar. 20, 2003

(51) Int. Cl.[7] .............................. G10K 5/00; G10K 9/00
(52) U.S. Cl. ................................. 116/58 R; 116/137 R
(58) Field of Search ....................... 116/112, 70, 137 R, 116/139, 58 R, 59; 446/202, 203, 207, 209, 213, 216

(56) References Cited

U.S. PATENT DOCUMENTS

| 513,168 | A | * | 1/1894 | Armer | ..................... | 116/58 R |
|---|---|---|---|---|---|---|
| 583,716 | A | * | 6/1897 | Short | ..................... | 446/209 |
| 620,958 | A | * | 3/1899 | Pierman | ..................... | 116/59 |
| 1,324,784 | A | * | 12/1919 | Barr | ..................... | 116/58 R |
| 1,432,342 | A | * | 10/1922 | Keri | ..................... | 116/58 R |
| 2,689,543 | A | * | 9/1954 | Lemmon | ..................... | 116/137 R |
| 2,809,520 | A | * | 10/1957 | Richard, Jr. | ..................... | 73/170.07 |
| 2,893,344 | A | * | 7/1959 | Meyers | ..................... | 116/112 |
| 2,898,704 | A | * | 8/1959 | Sattler | ..................... | 446/213 |
| 4,735,592 | A | * | 4/1988 | Griffin | ..................... | 446/404 |
| 4,843,905 | A | * | 7/1989 | Jean | ..................... | 74/551.9 |
| 4,908,000 | A | * | 3/1990 | Counts | ..................... | 446/216 |
| 5,085,611 | A | * | 2/1992 | Sorensen et al. | ..................... | 446/216 |
| 5,283,547 | A | * | 2/1994 | Leon | ..................... | 340/432 |
| 5,829,491 | A | * | 11/1998 | Bennett | ..................... | 141/59 |
| 6,319,089 | B1 | * | 11/2001 | Cheng | ..................... | 446/409 |
| 2001/0000385 | A1 | * | 4/2001 | Newman | ..................... | 116/137 R |
| 2002/0178993 | A1 | * | 12/2002 | Seymour et al. | ..................... | 116/28 R |

* cited by examiner

Primary Examiner—Christopher W. Fulton
Assistant Examiner—R. Alexander Smith
(74) Attorney, Agent, or Firm—Risto A. Rinne, Jr.

(57) ABSTRACT

An apparatus for use with a bicycle includes a base portion and a whistle portion. The base portion is attached to a frame, fender, or handlebars of a bicycle. The whistle portion is attached to the base portion and is adapted to produce an audible sound when the bicycle is moving forward. The sound that is produced can be disabled by rotating the whistle portion relative to the base portion or by urging a member so as to obstruct the flow of air through the whistle portion.

10 Claims, 1 Drawing Sheet

BICYCLE WHISTLE

BACKGROUND OF THE INVENTION

1. Field of the Invention

The present invention, in general relates to whistles and, more particularly, to devices that produce an audible sound for use on a bicycle.

Devices that produce sound on a bicycle are well known novelty items which include all manner of noise-making machines and attachments. For example, devices that click in response to the passage of each spoke of the bicycle's wheel are one well-known example of a noise-maker.

The purpose these devices have is novelty. They make a bicycle sound like a motorcycle or they produce some other sound for novelty purposes.

The problem inherent with all such devices is that they produce sound whenever the bicycle is moving forward. If two riders are moving and adjacent to one-another, such devices impede the ability to carry on a gentle conversation.

A problem that is increasing in frequency is that the streets and areas in which people ride bicycles are becoming more crowded with both pedestrians and other motorists.

It is desirable to alert pedestrians and also motorists of the approach of a bicycle. Pedestrians are often unaware of the relatively silent approach of a bicycle from the rear and may suddenly turn into one that is overtaking them from the rear.

In areas where both bicycles and people commingle, it is common to hear each passing bicyclist announce, "Left!" meaning he or she is intending to pass a pedestrian on their left side.

Therefore, it is desirable to be able to provide an audible whistle for a bicycle that produces sound when desired to provide an indication of an approaching bicyclist and which can be disabled so as to produce silence when it is not needed.

Accordingly, there exists today a need for a bicycle whistle that can be attached to a bicycle frame, fender, or handlebars which is adapted to either produce a sound audible to a human when the bicycle is moving or which is adapted to not produce a sound when the bicycle is moving.

Clearly, such an apparatus would be a useful and desirable device.

2. Description of Prior Art

Bicycle noise making devices and accessories are, in general, known. For example, the following patents describe various types of these devices:

U.S. Pat. No. 6,319,089 to Cheng, Nov. 20, 2001;
U.S. Pat. No. 5,283,547 to Leon, Feb. 1, 1994;
U.S. Pat. No. 5,085,611 to Sorensen et al., Feb. 4, 1992;
U.S. Pat. No. 4,908,000 to Counts, Mar. 13, 1990;
U.S. Pat. No. 4,735,592 to Griffin, Apr. 5, 1988;
U.S. Pat. No. 2,898,704 to Sattler, Aug. 11, 1959;
and pending published applications,
No 20020178993 to Seymour et al., published Dec. 5, 2002 and
No. 20010000385 to Newmann, published Apr. 26, 2001.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a bicycle whistle that is inexpensive to manufacture.

It is also an important object of the invention to provide a bicycle whistle that is adapted to produce a sound that is audible to humans.

Another object of the invention is to provide a bicycle whistle that includes a first position that is adapted to produce an audible sound and a second position that is not adapted to produce an audible sound.

Still another object of the invention is to provide a bicycle whistle that is adapted for attachment to a frame, fender, or handlebars of a bicycle.

Still yet another object of the invention is to provide a bicycle whistle that is adapted to produce an audible sound when the bicycle is moving forward.

Yet another important object of the invention is to provide a bicycle whistle that includes a first position that is adapted to produce an audible sound when the bicycle is moving forward and a second position that is not adapted to produce an audible sound when the bicycle is moving forward.

Still yet another important object of the invention is to provide a bicycle whistle that is adapted to pivot from a first position that is adapted to produce an audible sound into a second position that is not adapted to produce an audible sound.

Still one further important object of the invention is to provide a bicycle whistle that includes a portion thereof that is adapted to be urged from a first position that is adapted to produce an audible sound into a second position that is not adapted to produce an audible sound.

Still one yet further important object of the invention is to provide a bicycle whistle that includes a portion thereof that is adapted to be urged from a first position that is adapted not to produce an audible sound into a second position that is adapted to produce an audible sound.

Briefly, a bicycle whistle that is constructed in accordance with the principles of the present invention has a base portion and a whistle portion. The base portion is adapted for attachment to a frame, fender, or handlebars of a bicycle. The whistle portion is attached to the base portion and is adapted to produce an audible sound when the bicycle is moving forward sufficient to create an airflow through the whistle portion. According to a first embodiment, the sound can be disabled by rotating the whistle portion relative to the base portion. According to a second embodiment, the sound can be disabled by urging a member to move sufficient to obstruct the flow of air through the whistle portion.

DETAILED DESCRIPTION OF THE INVENTION

Figure 1:
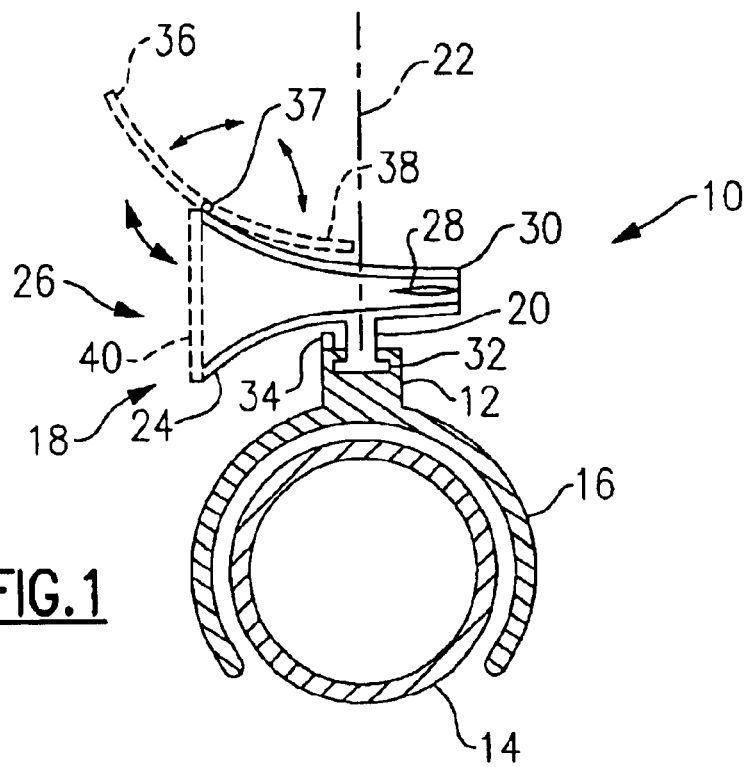
FIG. 1 is a cross sectional view taken along a center longitudinal line of a first embodiment of a bicycle whistle.

Referring to FIG. 1 is shown, a bicycle whistle, identified in general by the reference numeral 10.

The bicycle whistle 10 includes a base portion 12 that is attached to a handlebar 14 of a bicycle.

The base portion 12 includes a clamp 16 that is adapted to pass around at least a portion of the handlebar 14 sufficient to retain the base portion 12 in position.

The clamp 16 may retain the base portion 12 by friction fit or it may be secured to the handlebar 14 by other means and modification obvious to those having ordinary skill in the art of attaching accessories to the bicycle.

A whistle portion, identified in general by the reference numeral 18, is attached to the base portion 12, according to a first embodiment, by a pivot assembly 20 that allows the whistle portion 18 to rotate at least 90 degrees about an axis 22 with respect to the base portion 12.

In a first position (shown) the whistle portion 18 includes a front 24 that is facing in a forward direction (i.e., in a direction that the bicycle is heading). The whistle portion includes an air intake, identified in general by the reference numeral 26 that faces forward in the first position.

When the bicycle moves forward a differential in air speed is experienced in which air enters in the air intake 26, passes through the body of the whistle portion 18, past a reed 28, and exits from a rear 30 of the whistle portion 18.

The reed 28 vibrates in response to the passage of air producing a sound (i.e., a whistle) that includes a frequency in a normal audible band of hearing for humans. Accordingly, when the bicycle is moving forward and the whistle portion 18 is in the first position, the sound is produced.

If, of course, there was a tail wind that had an equal or greater velocity with respect to the ground when compared to that of the bicycle, the air would not pass by the reed 28 and no sound would be produced. This is not a typical condition and will rarely occur.

However, if it does and sound is desired, then it is possible to rotate the whistle portion 18 with respect to the base portion 12 so that the air, moving relative to the bicycle, can nevertheless enter in through the air intake 26 and produce sound. This is an unexpected benefit absent all of the known prior art devices.

The pivot assembly 20 includes a flanged ring 32 that cooperates with a recess in the base portion 12. The flanged ring 32 allows the whistle portion 18 to rotate continuously, as desired, around the axis 22. Accordingly, the whistle portion 18 can be rotated away from the first position into a second position that is displaced at least 90 degrees away from the first position. In the second position, no sound is produced because no air passes by the reed 28.

Accordingly, depending upon any wind that might be blowing, its direction and velocity, the whistle portion 18 is rotated about the axis 22 to produce sound when desired and to not produce sound when not desired. Accordingly, when the whistle portion 18 is in the second position, no sound is produced and a rider (not shown) can listen to the sounds of nature or have a conversation with another rider (not shown) without audible interference from the bicycle whistle 10.

If sound is desired, such as when approaching a pedestrian (not shown), the whistle portion 18 is rotated into the first position prior to arrival by the rider so as to provide an audible warning of the impending approach to the pedestrian. This prevents the pedestrian from unknowingly turning abruptly into the path of the approaching bicycle as it passes the pedestrian, for example.

The same audible sound warning can be used to warn motorists, as well, of the presence of the bicycle and rider.

Another unexpected benefit provided by the instant invention is that the volume of the sound that is produced can be adjusted to suit the circumstances. If all is quiet and the pedestrian is walking, then the whistle portion 18 can be rotated only partially toward the first position so as to produce a low volume of sound (i.e., in which the whistle portion 18 only partially faces forward, for example, or only partially faces into the direction of the prevailing wind).

The soft audible sound is likely to produce a response in which the pedestrian turns to view the approaching bicycle or otherwise acknowledges its approach, for example, by stepping to the right of the path. The rider then knows that the soft audible sound has been heard and can rotate the whistle portion 18 back into the second position of quiet.

If the circumstances are different, for example if there are loud ambient noises or if a group of pedestrians are talking, then the whistle portion 18 can be rotated fully into the first position or fully in the direction of the prevailing wind so as to produce maximum volume thereby providing the best chance that the audible sound will be heard and acknowledged by the group of pedestrians. After safe passage has occurred, the whistle portion 18 can be rotated back into its second position.

If it is desired to limit the amount of rotation that the whistle portion 18 can experience relative to the base portion 12, then at least one limit stop 34 can be included, as desired.

According to a second embodiment, a substantially planar member 36 (dashed lines) is pivotally attached proximate the air intake 26 by a hinge 37. When the planar member 36 is urged into a first open position 38, air is able to enter the air intake 26 and produce the audible sound.

If the planar member 36 is urged (i.e., rotated) into a second closed position 40 so as to cover the air intake 26, then it will obstruct the flow of air through the whistle portion 12 sufficient to prevent the audible sound from being produced.

Many modifications are possible to the bicycle whistle 10. For example, the base portion 12, the clamp 16, or any other component of the bicycle whistle 10 can be modified as those skilled in the art will be able to envision after having had benefit of the instant disclosure.

For example, the clamp 16 can be used or modified as required to fit around a frame member of the bicycle. Accordingly, the handlebar 14 of FIG. 1 can serve also to illustrate attachment of the clamp 16 to the frame member. Because the frame member typically includes a longitudinal axis that is perpendicular to a longitudinal axis of the handlebar 14 (when the handlebar 14 is facing forward), the first and second positions are transposed when the bicycle whistle 10 is attached to the frame member. Accordingly, the whistle portion 18 is rotated about 90 degrees when the bicycle whistle 10 is attached to the frame member to attain either the first or second positions, as desired.

Figure 2:
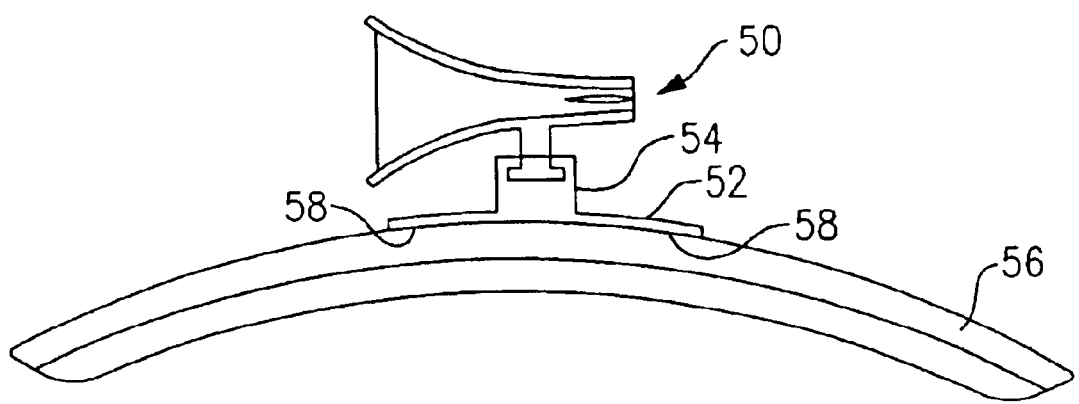
FIG. 2 is a cross sectional view taken along a center longitudinal line of a second embodiment of a bicycle whistle.

Referring to FIG. 2, is shown a second embodiment of a modified bicycle whistle 50 in which a modified clamp 52 is attached to a modified base portion 54 and is adapted for attachment to a front fender 56 of the bicycle. An adhesive 58 is included intermediate the top of the fender 56 and a bottom of the modified clamp 52 and is used to retain the modified bicycle whistle 50 in position. Of course, other types of fasteners (not shown) can be used to attach the modified clamp 52 to the fender 56.

It is also noted that the whistle portion 18 includes a larger cross-sectional area at the front 24 than proximate the reed 28. This produces a venturi effect whereby the velocity of the air passing through the whistle portion 18 accelerates as the cross section decreases.

Accordingly, an optimum (i.e., maximum) velocity of air passing by the reed 28 is assured for any given speed of the bicycle or wind speed. This provides a method useful to produce sound at a low velocity (of the bicycle) and also to increase the volume of sound that is produced for any given velocity.

It is anticipated that other types of devices (not shown) to produce an audible sound can be substituted for the whistle portion 18 to produce an audible sound with a different characteristic, as desired.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A bicycle whistle, comprising:
   (a) means for producing an audible sound, said audible sound producing a whistling sound of a frequency that is audible to a person having a normal range of hearing and wherein said means for producing an audible sound includes a whistle;
   (b) means for attaching said means for producing an audible sound to a bicycle;
   (c) means adapted for disabling said means for producing an audible sound; wherein a portion of said bicycle whistle includes a first position that is adapted to produce said audible sound and a second position that is not adapted to produce said audible sound; and
   (d) wherein said means adapted for disabling said means for producing an audible sound includes a planar member that is pivotally attached at one end thereof proximate an air intake of a body of said bicycle whistle and wherein said planar member is adapted to pivot from a first open position in which air is not impeded from entering said air intake into a second closed position in which said planar member is adapted to cover said air intake sufficient to prevent a sufficient amount of air from entering said air intake to produce a whistling sound.

2. The bicycle whistle of claim 1 wherein said whistle includes a reed.

3. The bicycle whistle of claim 1 wherein said whistle includes a front and a rear and wherein said front includes said air intake for air to enter a body of said whistle and said rear includes an opening for air to exit from said body.

4. The bicycle whistle of claim 3 wherein said body includes a larger cross-section at said front than proximate a reed that is disposed in said whistle.

5. The bicycle whistle of claim 3 wherein said body includes a venturi whereby a velocity of air passing through said body is accelerated prior to its discharge from said rear.

6. The bicycle whistle of claim 1 wherein said means for attaching said means for producing an audible sound to a bicycle includes means adapted for attaching to a handlebar.

7. The bicycle whistle of claim 1 wherein said means for attaching said means for producing an audible sound to a bicycle includes means adapted for attaching to a frame member.

8. The bicycle whistle of claim 1 wherein said means for attaching said means for producing an audible sound to a bicycle includes means adapted for attaching to a fender.

9. The bicycle whistle of claim 1 wherein said means adapted for disabling said means for producing an audible sound includes providing a base portion and a whistle portion pivotally attached to said base portion, and wherein said whistle portion is adapted to rotate about an axis with respect to said base portion from a first position into a second position, and wherein said first position is adapted to produce said audible sound and said second position is not adapted to produce said audible sound.

10. A bicycle whistle, comprising:
    (a) a base portion;
    (b) means for attaching said base portion to a bicycle;
    (c) a whistle portion, said whistle portion adapted to produce an audible whistling sound having a frequency that is audible to a person having a normal range of hearing when said bicycle is moving forward relative to a surface of the ground; and
    (d) including means adapted for preventing said audible sound from being produced when said bicycle is moving forward wherein said whistle portion includes a pivot assembly that is pivotally attached to said base portion and wherein said pivot assembly includes a flanged ring and wherein said flanged ring is disposed in a recess in said base portion and wherein said flanged ring is adapted to pivot about a longitudinal axis of said pivot assembly in said recess an amount that exceeds 360 degrees of arc rotation in either a clockwise or a counter-clockwise direction of rotation with respect to said base portion, and wherein said whistle portion is adapted to rotate about said longitudinal axis from a first position into a second position, and wherein said first position is adapted to produce said audible whistling sound and said second position is not adapted to produce said audible whistling sound.

* * * * *